L. G. NILSON.
MOTOR VEHICLE.
APPLICATION FILED FEB. 23, 1906.
932,312.
Patented Aug. 24, 1909.
2 SHEETS—SHEET 1.
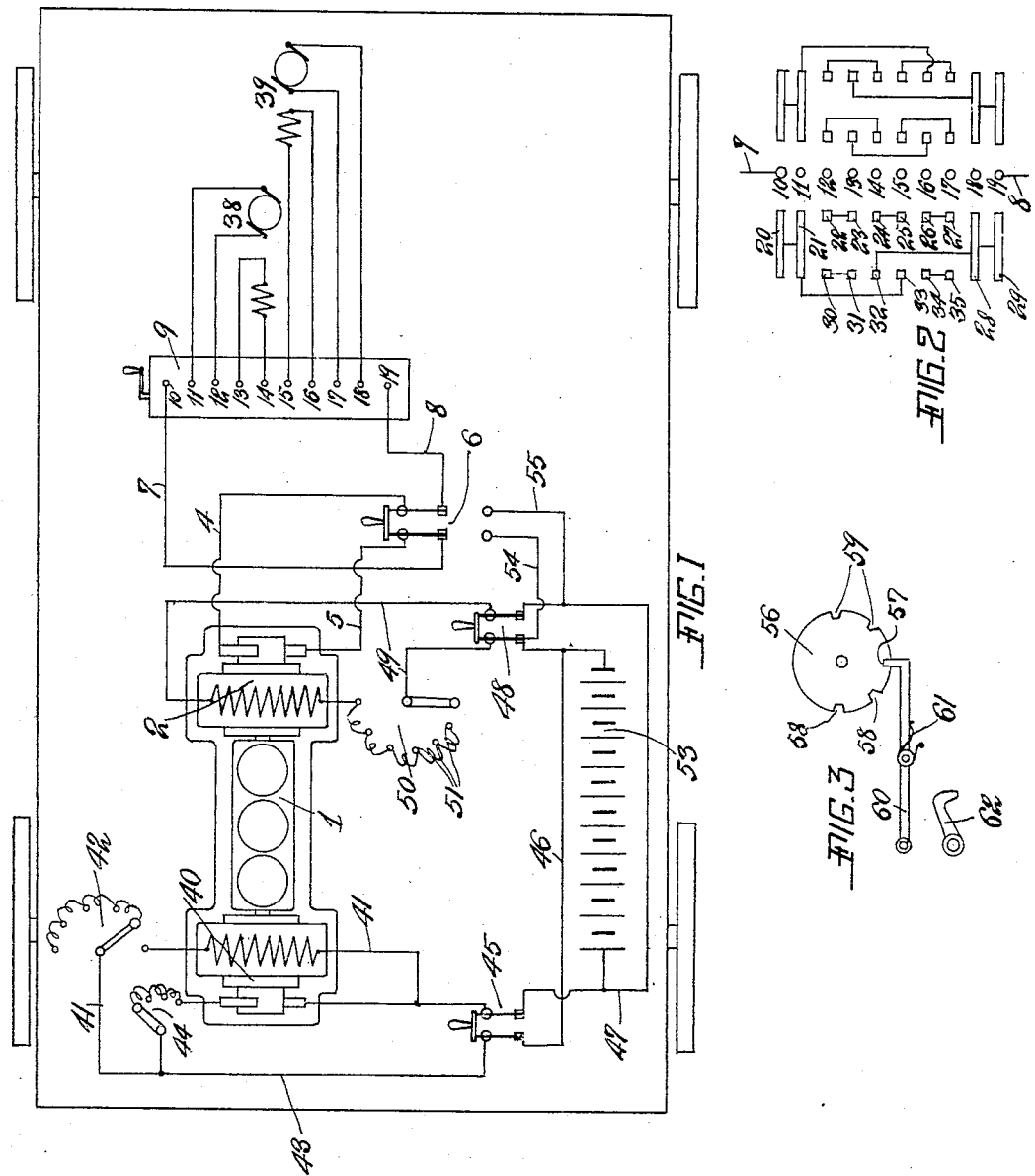
Witnesses
Julian S. Wooster
Geo. N. Kerr
Lars G. Nilson   Inventor
By his Attorney C. W. Edwards

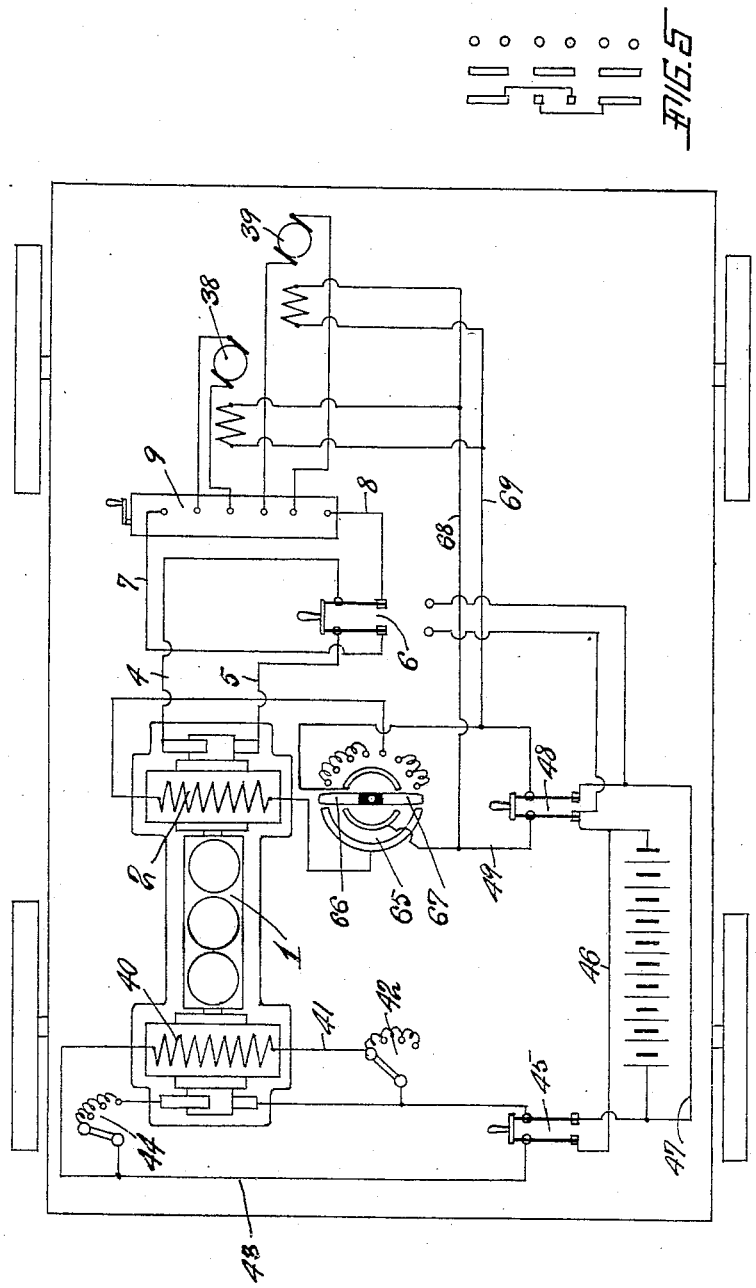

UNITED STATES PATENT OFFICE.

LARS G. NILSON, OF PHILADELPHIA, PENNSYLVANIA, ASSIGNOR TO WILLIAM B. STRANG, OF NEW YORK, N. Y.

MOTOR-VEHICLE.

932,312.  Specification of Letters Patent.  Patented Aug. 24, 1909.

Application filed February 23, 1906. Serial No. 302,403.

*To all whom it may concern:*

Be it known that I, LARS G. NILSON, a citizen of the United States, residing at Philadelphia, in the county of Philadelphia and State of Pennsylvania, have invented certain new and useful Improvements in Motor-Vehicles, of which the following is a full, clear, and exact specification.

This invention relates to motor vehicles and more particularly has reference to electrically propelled vehicles wherein the current for driving the motors is generated as used, by a dynamo carried by the vehicle itself.

An object of the invention is to provide a generator unit wherein a storage battery may be used to assist the engine in case of an overload, without being itself subject to the fluctuating conditions of the working circuit. A further object of the invention is to provide in conjunction with such a generator unit, an improved system of control whereby a wide range of speed variation may be obtained without necessarily employing resistances in the working circuit or making it necessary to make and break the motor circuit.

In the systems using a storage battery connected in multiple across the working circuit, the storage battery is subject to the extremes of current taken by the motors, as for instance, the heavy currents necessary in starting, but according to this invention, the storage battery is disposed in a circuit distinct from the working circuit and containing an auxiliary machine which is coupled to the engine, so as to act at times as a motor to mechanically assist the engine in case of an overload, and at other times to act as a generator to charge the storage battery.

In the embodiment of the invention herein shown, the dynamo supplying the working circuit is separately excited by the auxiliary machine or the storage battery, suitable switches and connections being provided so that the engine can be started by current from the storage battery, using the auxiliary machine as a motor, or the working dynamo excited by the storage battery, or the working circuit supplied directly.

To avoid the waste of current involved in using starting resistances, a further feature of the invention contemplates speed control by varying the output of the working dynamo, and direction control by means of a separate controller in the working circuit in the case of series motors, or by reversing the current in field or armature in the case of a shunt or separately excited motor. The direction control for a plurality of motors may be supplemented by the provision of series parallel or other connections therefor. A wide range of speeds forward and backward can in this manner be secured, depending upon the controller connections, and also upon the number of positions the field switch may have. Between the separate direction controller and the field switch, interlocking mechanism will be provided, so as to prevent movement of the direction controller except when there is no current in the working circuit.

By the described arrangement, a complete generating system is provided, wherein the storage battery automatically assists the engine to maintain the output of the dynamo when overloaded by the working circuit, without being directly subject to the large fluctuations of the working circuit, and at the same time a wide range of speeds of the working motor or motors may be obtained with a considerable economy of current.

Referring to the accompanying drawings, Figure 1 represents a diagram of my invention; Fig. 2 shows a diagram of the motor circuit controller connections, for two positions in each direction, Fig. 3 is a detail view showing an arrangement of interlocking mechanism between the motor circuit controller and the running switch. Fig. 4 is a view of a somewhat modified application of my invention, and Fig. 5, shows a diagram of the controller connections, where a two motor equipment is used.

1 represents an explosion or combustion engine, preferably of any well known multi-cylinder type, which drives the main or working dynamo 2. The armature circuit of dynamo 2 leads from the brushes by wires 4, 5, to the direction controller 9, preferably through a double pole, double throw switch 6, whose function will be described later. The controller 9 comprises a series of contact fingers 10, 11, 12, 13, 14, 15, 16, 17, 18, 19, to which latter wire 8 is connected, and a rotatable drum having two sets of contacts connected as shown, the contacts 20, 21, 22, 23, 24, 25, 26, 27, 28, 29, controlling a series arrangement of the working motors, and the contacts 20, 21, 30, 31, 32, 33, 34, 35, 28, 29, a parallel arrangement. Fingers 11 and 12 are connected to the armature circuit, and fingers 13, 14, to the field circuit, and fingers 17, 18, and 15, 16, are similarly connected to motor 39, these motors being preferably of the series type. The circuit connections on the right side of Fig. 3 will cause the motors to rotate oppositely to the left hand connections.

The field circuit of dynamo 2 is separately excited from the machine 40, which latter is coupled to the engine so as to be driven thereby, 41 being the shunt field circuit having a rheostat 42, and 43 the armature circuit having a rheostat 44. The armature circuit 43 of machine 40, leads through a double throw switch 45, and thence by wires 46, 47, to the poles of a switch 48, which is in the field circuit 49 of dynamo 2.

50 is the running switch, preferably a rheostat, by which the field strength, and consequently the output of dynamo 2 will be varied so as to determine the speed of the working motors, according to the connections made by the direction controller 9. The switch 50 consists of an arm which successively moves over contacts 51 to short circuit resistances and thereby vary the field strength of dynamo 2. With the arm in the off position shown, there being no field excitation, there is no current at the terminals of controller 9, and it can be moved from one position to another without sparking, but as the field is excited by closing switch 50 the output of the dynamo 2 increases as its field strength is increased by cutting out the resistances, thereby speeding up the working motors. It is thus possible to control the motors so as to secure a large number of speeds in either direction without using resistances in the working circuit, and without interrupting the working circuit between the dynamo and the motors, thereby avoiding both waste of current and also the arcing which occurs upon interrupting the large current in the working circuit.

53 is a storage battery which is connected in multiple across the mains 46, 47, so as to be charged by the machine 40 when operating as a dynamo. From the switch 48, leads 54, 55, are connected to the other terminals of the double throw switch 6, so that the motors can be operated from the dynamo 40 and the storage battery 53, either by machine 40 when driven by the engine as a dynamo, or from the storage battery alone, the engine being idle. This provision is of advantage when it is desired to move the vehicle a short distance without necessitating starting the engine.

In order to start the vehicle, assuming the engine running, it will be necessary to first move the controller 9 in one or the other direction so as to connect the motors in series or in parallel, the first positions, at either side of the off position, being preferably series positions, respectively, and the next being shown as parallel positions, though additional series and parallel positions may be used where a greater number of speeds is desired. Interlocking mechanism is provided between the running switch 50, and the controller 9, which normally locks the controller 9, and is automatically released when the switch 50 is in open position. This condition is shown in Fig. 1, both switch 50 and controller 9 being in off position. The controller drum is provided with a disk 56, having notches 57, 58, 58, 59, 59, corresponding respectively to the off position, and series and parallel positions in opposite directions. 60 is a lever intermediately pivoted on the controller frame and having a lug adapted to engage the notches of disk 56. The lever 60 is caused to normally bear against disk 56 by a spring 61. On the free end of lever 60 is a roller or cam which is engaged by an arm 62 mounted to move with switch arm 50, the arm 62 disengaging the lever 60 from the disk 56 to allow the drum to be rotated only when switch 50 is in off position. At other positions of switch 50, it will be seen that the controller 9 will be locked against rotation, and only free to move when there is no current in the working circuit, as when the field circuit of dynamo 2 is open.

Having moved the controller drum 9 to determine the relation of the motor circuits, the running switch 50 is moved to close the dynamo field circuit, it being remembered that the engine ordinarily runs continuously while the vehicle is in active use. The controller 9 cannot now be moved until the switch 50 is brought back to off position, the various speeds attained depending upon the positions of switch 50 and controller 9.

In Fig. 5, I show a modification in which the running switch also controls the direction of the working motor as well as its speed, and with a plurality of working motors, the controller 9 will simply be used to determine the circuit connections of the motors. With a single motor, the controller 9 may be used in this form of the invention to secure speed changes by the use of resistances, or by commutating the field windings, as is well understood in the art at the present time. 65 is a double reversing rheostat of any well known type interposed in the field circuit of dynamo 2, and interlocked with the controller 9 as before described so that the latter can only be moved when the former is in the off position shown. It will be seen that the direction of current through the fields of dynamo 2 will depend upon the respective positions of the switch arms 66, 67, of switch 65. As the field of dynamo 2 is reversed the current in the mains 7, 8, will also be reversed. If this be done with a series motor however, its direction of rotation will not be reversed, and in carrying out this form of my invention, I provide means for separately exciting the motor fields by leads 68, 69, connected in the circuit of the running switch 65, so that the opening of switch 48 will also open the field circuit of the working motors. It will also be obvious that the reversing running switch may be interposed in the field or armature circuits of the motors if preferred, the same results being secured, so far as reversing the direction of the motors is concerned. When the motors are run by the battery alone, they will run as shunt motors, the switch 48 remaining closed.

The dynamos 2, and 40, and the storage battery will be respectively proportioned according to the conditions to be met, but in general, it may be said that the dynamo 2 with full field excitation, should give sufficient current at the normal speed of the engine, to operate the working motors under normal load at the maximum running speed. The dynamo 40 will be proportioned so as to charge the storage battery and supply the maximum field current for the dynamo 2. Whenever the load on the working dynamo 2 is increased, so as to tend to slow down the engine, the reduction in speed will be such as to cause the dynamo 40 to temporarily become a motor driven by the storage battery and thereby assist the engine to run the dynamo 2. As soon as the normal speed is restored, the motor again becomes a dynamo and restores the charge given out by the storage battery. With the arrangement herein described, a prolonged overload might necessitate regulation of the power of the engine, or the reduction of engine load by weakening the field of dynamo 2, but within ordinary conditions of operation, and the capacity of the storage battery, this generating system will be self regulating. The engine may be started from the storage battery without cranking, by using the dynamo 2 as a motor. This is accomplished by closing the switch 45, the speed being controlled by moving the rheostat 44. The field rheostat 42 may be used to regulate the voltage of the machine 40 when running as a generator.

It will be seen that a generating system is provided which will be automatically self regulating without having the storage battery in the main working circuit, and also that by combining the direction controller with the running switch a large number of speeds may be attained without using resistances in the motor circuits. With this system the storage battery is not subject to liability to injury because of extreme current fluctuation and its life will be prolonged.

The invention is capable of use by means of apparatus other than that herein specifically described, so that I do not restrict myself to the exact arrangement herein shown.

Having thus described my invention, I declare that what I claim as new and desire to secure by Letters Patent, is,—

1. The combination of an engine, a dynamo driven thereby, a working circuit supplied by said dynamo, and an auxiliary circuit including a source of supply and a motor for starting said engine, substantially as described.

2. The combination with an engine, a dynamo driven thereby, and a circuit supplied by said dynamo, of a motor for starting said engine, and connections whereby after the engine is started said motor becomes a dynamo to supply current for exciting said first dynamo, substantially as described.

3. The combination with an engine, a dynamo driven thereby, and a circuit supplied by said dynamo, of a motor for starting said engine, a source of supply for said motor, and connections whereby after the engine is started said motor becomes a dynamo to supply current for replenishing said supply and for exciting said first dynamo, substantially as described.

4. The combination with an engine, a separately excited dynamo driven thereby, and a working circuit supplied by said dynamo, of an exciting dynamo driven by said engine and supplying current for exciting said separately excited dynamo, a storage battery connected in multiple with said exciting dynamo, and connections whereby said storage battery can be used to start the system using the exciting dynamo as a motor, to supply the exciting current for the first dynamo, and to supply the working circuit directly, substantially as described.

5. The combination with an engine, a dynamo driven thereby, and a working circuit supplied by said dynamo, of a storage battery and means whereby said storage battery in case of an overload automatically supplies energy to mechanically assist the engine in driving the dynamo, substantially as described.

6. The combination with an engine, a dynamo driven thereby, and a working circuit supplied by said dynamo, of a storage battery and means whereby said storage battery in case of an overload automatically supplies energy to mechanically assist the engine in driving the dynamo, and means in the storage battery circuit for controlling the output of the dynamo, substantially as described.

In testimony whereof I affix my signature, in presence of two witnesses.

LARS G. NILSON.

Witnesses:
JULIAN S. WOOSTER,
GEO. N. KERR.